US012624166B2

(12) United States Patent
Louis et al.

(10) Patent No.: US 12,624,166 B2
(45) Date of Patent: May 12, 2026

(54) FILMS FOR MULTIPLE LAYERS ASSEMBLIES

(71) Applicants: SYENSQO SPECIALTY POLYMERS USA, LLC, Alpharetta, GA (US); Cytec Industries Inc., Lawrence, NJ (US)

(72) Inventors: Chantal Louis, Alpharetta, GA (US); James Francis Pratte, Wilmington, DE (US); Mohammad Jamal El-Hibri, Atlanta, GA (US); Yiqiang Zhao, Newark, DE (US)

(73) Assignees: Syensqo Specialty Polymers USA, LLC, Alpharetta, GA (US); Cytec Industries Inc., Lawrence, NJ (US)

(*) Notice: Subject to any disclaimer, the term of this patent is extended or adjusted under 35 U.S.C. 154(b) by 208 days.

(21) Appl. No.: 18/547,349

(22) PCT Filed: Feb. 22, 2022

(86) PCT No.: PCT/EP2022/054437

§ 371 (c)(1),
(2) Date: Aug. 22, 2023

(87) PCT Pub. No.: WO2022/175555

PCT Pub. Date: Aug. 25, 2022

(65) Prior Publication Data

US 2024/0158575 A1 May 16, 2024

Related U.S. Application Data

(60) Provisional application No. 63/151,820, filed on Feb. 22, 2021.

(30) Foreign Application Priority Data

Jun. 25, 2021 (EP) .................................... 21181637

(51) Int. Cl.

| | |
|---|---|
| ***C08G 65/40*** | (2006.01) |
| ***B32B 5/02*** | (2006.01) |
| ***B32B 27/08*** | (2006.01) |
| ***B32B 27/12*** | (2006.01) |
| ***B32B 27/20*** | (2006.01) |
| ***B32B 27/28*** | (2006.01) |
| ***B32B 37/04*** | (2006.01) |
| ***C08K 3/38*** | (2006.01) |

(52) U.S. Cl.

CPC .......... *C08G 65/4012* (2013.01); *B32B 5/022* (2013.01); *B32B 5/028* (2013.01); *B32B 27/08* (2013.01); *B32B 27/12* (2013.01); *B32B 27/20* (2013.01); *B32B 27/285* (2013.01); *B32B 27/288* (2013.01); *B32B 37/04* (2013.01); *C08K 3/38* (2013.01); *B32B 2260/023* (2013.01); *B32B 2260/046* (2013.01); *B32B 2262/101* (2013.01); *B32B 2262/106* (2013.01); *B32B 2307/7376* (2023.05); *B32B 2371/00* (2013.01); *C08G 2650/40* (2013.01); *C08K 2003/385* (2013.01)

(58) Field of Classification Search

CPC .......... B32B 5/022; B32B 5/024; B32B 5/26; B32B 27/12; B32B 27/288; B32B 27/08; B32B 27/18; B32B 27/26; B32B 27/281; B32B 27/285; B32B 27/286; B32B 27/34; B32B 27/36; B32B 27/04; B32B 27/365; B32B 27/1207; B32B 27/203; B32B 27/1223; B32B 2307/7376; B32B 2307/30; B32B 2307/31; B32B 2307/558; B32B 2307/738; B32B 7/12; B32B 2250/03; B32B 2250/40; B32B 2260/40; B32B 2260/021; B32B 2260/023; B32B 2260/046; B32B 2262/101; B32B 2262/103; B32B 2262/106; B32B 2270/00; B32B 2605/08; B32B 2605/18; C09J 171/10; C09J 11/04; C09J 7/10; C09J 2301/20; C09J 2301/304; C08L 2205/025; C08L 71/10; C08G 65/4012; C08G 2650/40; C08K 3/38; C08K 2003/385; C08K 2201/019

USPC .............................................................. 442/1

See application file for complete search history.

(56) References Cited

U.S. PATENT DOCUMENTS

| | | | |
|---|---|---|---|
| 5,219,642 | A | 6/1993 | Meakin et al. |
| 5,250,738 | A | 10/1993 | Hackenbruch et al. |

(Continued)

FOREIGN PATENT DOCUMENTS

| | | | |
|---|---|---|---|
| WO | 2011001103 | A2 | 1/2011 |
| WO | 2015198063 | A1 | 12/2015 |

(Continued)

OTHER PUBLICATIONS

"Standard Test Method for Transition Temperatures and Enthalpies of Fusion and Crystallization of Polymers by Differential Scanning Calorimetry;" Standard ASTM D3418-12; 2012; pp. 1-7 (7 pages).

(Continued)

*Primary Examiner* — Camie S Thompson

(74) *Attorney, Agent, or Firm* — Osha Bergman Watanabe & Burton LLP

(57) ABSTRACT

The present invention relates to assembly comprising a first component and a second component, each component comprising a polymer, as well as a film positioned between and bonded to the first component and the second component. The film is such that it comprises at least one poly(ether ketone ketone) (PEKK) polymer and at least one nucleating agent. The assembly has an improved fracture toughness and overall good mechanical properties.

20 Claims, No Drawings

(56) References Cited

U.S. PATENT DOCUMENTS

| | | | |
|---|---|---|---|
| 5,300,693 | A | 4/1994 | Gilb et al. |
| 7,794,823 | B2 | 9/2010 | Stecher |
| 10,012,621 | B2 | 7/2018 | Dehmer |
| 10,150,277 | B2 | 12/2018 | Meer |
| 10,364,349 | B1 | 7/2019 | Bertelo et al. |
| 11,117,311 | B2 | 9/2021 | Bheda et al. |
| 11,458,713 | B2 | 10/2022 | Spahr et al. |
| 2011/0097575 | A1 | 4/2011 | Pratte et al. |
| 2012/0160829 | A1 | 6/2012 | Dufaure et al. |
| 2019/0031908 | A1 | 1/2019 | Louis et al. |
| 2019/0276667 | A1 | 9/2019 | Zhang et al. |
| 2019/0392964 | A1 | 12/2019 | Bihler et al. |
| 2022/0389218 | A1 | 12/2022 | Kang et al. |

FOREIGN PATENT DOCUMENTS

| | | | |
|---|---|---|---|
| WO | 2018115033 | A1 | 6/2018 |
| WO | 2018115233 | A1 | 6/2018 |
| WO | 2019143433 | A1 | 7/2019 |
| WO | 2021085797 | A1 | 5/2021 |

OTHER PUBLICATIONS

"Standard Test Method for Rapid Thermal Degradation of Solid Electrical Insulating Materials by Thermogravimetric Method;" Standard ASTM D3850-19; 2019; pp. 1-5 (5 pages).

International Search Report issued in Application No. PCT/EP2022/054437, mailed on May 31, 2022 (4 pages).

Written Opinion issued in Application No. PCT/EP2022/054437, mailed on May 31, 2022 (8 pages).

FILMS FOR MULTIPLE LAYERS ASSEMBLIES

The present application is a national stage entry under 35 U.S.C. § 371 of International Application No. PCT/EP2022/054437 filed on Feb. 22, 2022, which claims the priority of provisional application U.S. 63/151,820 filed on Feb. 22, 2021 and European patent application EP 21181637.6 filed on Jun. 25, 2021. The entire contents of these applications are explicitly incorporated herein by this reference. In case of any incoherency between the present application and the PCT application that would affect the clarity of a term or expression, reference should be made to the present application only.

TECHNICAL FIELD

The present invention relates to assembly comprising a first component and a second component, each component comprising a polymer, as well as a film positioned between and bonded to the first component and the second component. The film is such that it comprises at least one poly (ether ketone ketone) (PEKK) polymer and at least one nucleating agent. The assembly can notably be used to prepare parts and articles for the aerospace and automotive industries.

BACKGROUND ART

Within many industries, in particular the aerospace industry, considerable use is made of laminates, composites and other assemblies comprising multiple layers of different materials, each material contributing specific properties to the final assembly. It has often proven to be challenging to achieve satisfactory adhesion or bonding directly between the dissimilar layers that may need to be utilized in a composite or laminate. Poor compatibility between composite layers can limit the properties exhibited by such assemblies. In particular, certain thermoplastic polymers (particularly crystalline and/or high temperature thermoplastics) exhibit poor adhesion to other materials, leading to problems with delamination and loss of structural integrity when the assembly is placed in use in a highly demanding environment.

A number of techniques have been proposed to secure and/or bond thermoplastic components together. In particular, many different welding processes, such as ultrasonic welding, induction welding and hot-plate welding, have been proposed for securing first and second thermoplastics components together. However, local melting of the first and second parts in the region of the weld may affect the integrity and/or shape of the parts. It may also lead to distortion due to residual stress build-up in the parts during the melting and/or cooling of the thermoplastic in the region of the weld.

In order to address some of the problems associated with welding processes, it has been proposed to provide a film and/or adhesive between parts and/or layers to bond them together.

WO 2011/001103A2 describes the use of an amorphous poly(ether ketone ketone) (PEKK) film as a tie layer in assemblies such as composites and laminates. However, given the amorphous nature of the film, it is not deemed suitable for use in structural applications in the aerospace industry. As a general point, the use of amorphous materials as bonding layer in a composite may represent the weakest part of the structure, where properties such as solvent resistance are relatively low. Thus, the joint may be prone to attack by fluids leading to premature failure of the structure.

WO 2015/198063A1 discloses the use of a polymeric material which comprises a PEEK-PEDEK polymer, that is a polymer having a repeat unit of formula —O-Ph-O-Ph-CO-Ph- I and a repeat unit of formula —O-Ph-Ph-O-Ph-CO-Ph- II wherein Ph represents a phenylene moiety, as an adhesive between a first part and a second part comprising polyaryletherketone polymers, in particular PEEK. The mechanical properties of PEEK-PEDEK polymers are however not as good as those of other polyaryletherketone polymers.

WO 2021/085797, WO 2019/243433 and WO 2018/115233 are other applications of the art but they do not disclose the subject-matter of claim 1.

Technical Problem

There is a need of a film which is capable of bonding strongly together two components (or parts) made of polymers, so as to prepare an assembly presenting improved chemical resistance and improved mechanical properties.

The film should be processed at a temperature lower than the melting temperature of the two components to be bound, and advantageously at a temperature lower than 310° C.

The invention aims at solving this technical problem.

BRIEF DESCRIPTION OF THE INVENTION

The invention is set out in the appended set of claims. An object of the invention is thus an assembly.

Another object of the invention is a method for making an assembly.

Another object of the invention is a part or article.

Another object of the invention is the use of an assembly.

Another object is the composition comprising the PEKK polymer.

More precisions and details about these objects are now provided below.

DISCLOSURE OF THE INVENTION

The present invention is in the field of laminates, composites and other assemblies comprising multiple layers of different materials, each material contributing specific properties to the assembly. These assemblies comprise at least two components which may be the same or different, as well as at least one film, which is sometimes referred to herein as a "bonding film".

The films used described in the present disclosure present a set of properties which make them well-suited to bond polymeric components in assembly structure, in particular in assembly structures made of poly(aryl ether ketone) (PAEK) polymers. These films comprise at least one poly(ether ketone ketone) (PEKK) polymer and at least one nucleating agent. The PEKK polymer is such that its T/I ratio ranges between 50:50 and 56:44, preferably a T/I ratio ranging between 51:49 and 55:45. This PEKK polymer additionally presents a crystallinity which makes it well-adapted to assembly structure where there is a need for chemical resistance and mechanical properties, as it is the case of composite structures in the aerospace industry.

The films described herein are advantageously compatible with the polymeric components to be bound.

In the present application:

any description, even though described in relation to a specific embodiment, is applicable to and interchangeable with other embodiments of the present disclosure;

where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

A first object of the invention is an assembly comprising:

a first component comprising a polymer (P1), a second component comprising a polymer (P2) and a film positioned between and bonded to the first component and the second component, wherein the film comprises at least one poly(ether ketone ketone) (PEKK) polymer, presenting a certain T/I ratio, and at least one nucleating agent.

In the context of the present invention, the term “bonded” means that the components are attached to one another or to each other, preferably permanently.

The film of the assembly may additionally comprise scrim(s) and/or non-woven reinforcement(s) and/or lightweight fabric(s), which help to regulate the melt flow and/or provide a uniform surface to bond to, as well potentially influencing the local morphology in the bond line.

The assembly of the invention may also comprise further components (third, fourth, fifth, . . . ) and films, depending on the composite part to be built. For example, the assembly of the invention may comprise a third component comprising a polymer (P3) and a film between the second and third component, wherein this additional film binds the second and third components together.

PEKK Polymer

The poly(ether ketone ketone) (PEKK) polymer described herein is such that it comprises at least 50 mol. % of recurring units of formulas (M) and (P), the mol. % being based on the total number of moles in the polymer:

(P)

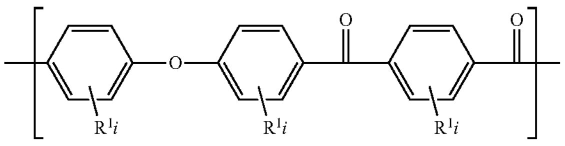

(M)

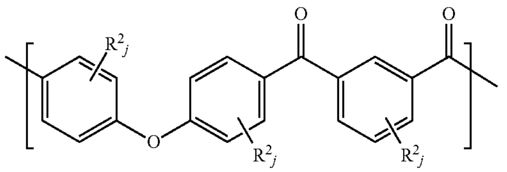

wherein $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4;

wherein the molar ratio of recurring units (P) to recurring units (M) (also called herein “T/I ratio”) is from 50:50 to 56:44, preferably from 51:49 to 55:45.

According to an embodiment, $R^1$ and $R^2$ are, at each location in formula (P) and (M) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units of formulae (M) and (P).

In an embodiment, substantially all of the recurring units of the PEKK are recurring units of formulae (M) and (P). In an embodiment, the recurring units of the PEKK consist of recurring units of formulae (M) and (P).

The molar ratio of recurring units (P) to recurring units (M), also called “T/1 ratio”, of the PEKK employed as polymeric component of the film ranges between 50:50 and 56:44, preferably between 51:49 and 55:45. The PEKK preferably has a T/I ratio of 54:46 or of 53:47.

According to another embodiment, i and j are zero for each $R^1$ and $R^2$ group. According to this embodiment, the PEKK polymer comprises at least 50 mol. % of recurring units of formulas (M') and (P'), the mol. % being based on the total number of moles in the polymer:

(P')

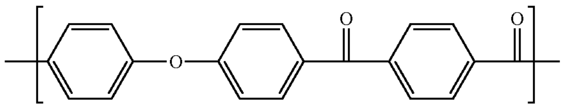

(M')

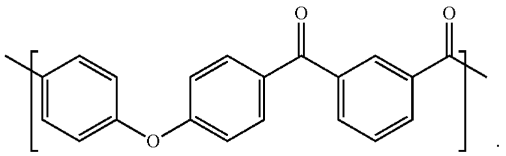

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units of formulae (M') and (P').

In an embodiment, substantially all of the recurring units of the PEKK are recurring units of formulae (M') and (P'). In an embodiment, the recurring units of the PEKK consist of recurring units of formulae (M') and (P').

The molar ratio of recurring units (P') to recurring units (M'), also called “T/I ratio”, of the PEKK employed as polymeric component of the film ranges between 50:50 and 56:44, preferably between 51:49 and 55:45. The PEKK preferably has a T/I ratio of 54:46 or of 53:47.

As described above, the molar ratio of recurring units (P)/(P') to recurring units (M)/(M'), also called "T/I ratio", of the PEKK employed as polymeric component of the film ranges between 50:50 and 56:44, preferably between 51:49 and 55:45. The PEKK preferably has a T/I ratio of 54:46 or of 53:47.

According to an embodiment of the present disclosure, the PEKK polymer described herein has a Tm ranging from 270 to 310° C., preferably from 280 to 305° C., as measured by differential scanning calorimetry (DSC) according to ASTM D3418.

More particularly, the melting temperature Tm is measured by DSC according to ASTM D3418 and using a heating and cooling rate of 10° C./min. Tm is determined on the $2^{nd}$ heat scan. The following cycle can be followed:

$1^{st}$ heat cycle: 30.00° C. to 400.00° C. at 10.00° C./min, isothermal at 400.00° C. for 1 min;

$1^{st}$ cool cycle: 400.00° C. to 30.00° C. at 10.00° C./min, isothermal for 1 min;

$2^{nd}$ heat cycle: 30.00° C. to 400.00° C. at 10.00° C./min, isothermal at 400.00° C. for 1 min.

According to an embodiment of the present disclosure, the PEKK polymer described herein is such that heat of fusion ΔHf meets the following equation:

$$\Delta H_f > 1.69 \times T_m - 480 \quad \text{(eq 1)}$$

wherein:

Tm is the PEKK melting temperature in ° C. and $\Delta H_f$ is in J/g.

Such equation is an empirical equation that, in the context of the present invention, differentiates PEKK of acceptable crystallinity for a given melting temperature (Tm) from PEKK of non-acceptable crystallinity at the same Tm.

According to an embodiment of the present disclosure, the PEKK polymer described herein is such that heat of fusion ΔHf is at least 5 J/g, at least 6 J/g or at least 7 J/g. The heat of fusion may be as defined in one of claims 13-15.

More particularly, the heat of fusion measured by DSC on the $2^{nd}$ heat scan according to ASTM D3418 and using a heating and cooling rate of 10° C./min.

The following cycle can be followed:

$1^{st}$ heat cycle: 30.00° C. to 400.00° C. at 10.00° C./min, isothermal at 400.00° C. for 1 min;

$1^{st}$ cool cycle: 400.00° C. to 30.00° C. at 10.00° C./min, isothermal for 1 min;

$2^{nd}$ heat cycle: 30.00° C. to 400.00° C. at 10.00° C./min, isothermal at 400.00° C. for 1 min.

Synthesis of the PEKK Polymers

The synthesis of the PEKK polymers typically comprises a step of polycondensing the monomers in a solvent, in order to obtain the PEKK polymer, and a step of extracting the solvent and the salts.

In a preferred embodiment of the present invention, the polycondensation of the monomers takes place in the absence of a Lewis acid or takes place in the presence of an amount of Lewis acid of less than 2 wt. %, based on the total weight of the monomers, preferably less than 1 wt. %, more preferably less than 0.5 wt. %.

In the context of the present invention, the Lewis acid may be defined as selected from the group consisting of $BF_3$, $AlCl_3$, $FeCl_3$, $CF_3SO_3H$ and $CH_3SO_3H$.

In a preferred embodiment, the synthesis of the PEKK polymer, comprises:

Step a) polycondensing in a solvent, such as DPS, in the absence of a Lewis acid or in the presence of an amount of Lewis acid of less than 2 wt. %, based on the total weight of the monomers, preferably less than 1 wt. %, more preferably less than 0.5 wt. %, the following monomers (P-OH), (M-OH), (P-F) and/or (M-F):

(P-OH)

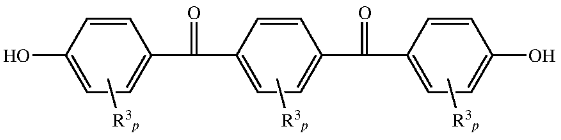

(M-OH)

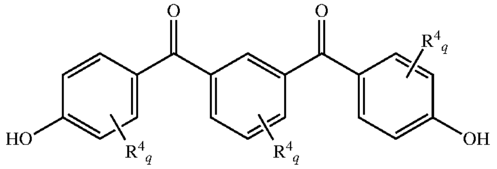

(P-F)

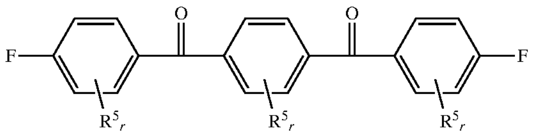

(M-F)

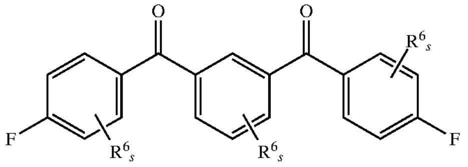

wherein:

$R^3$, $R^4$, $R^5$ and $R^6$, at each instance, are independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

p, q, r and s, at each instance, are independently selected from 0 to 4;

wherein the molar ratio of moles of (P-OH) and (M-OH) to moles of (P-F) and (M-F) is such that:

$$0.90 \leq \frac{n_{(P-F)} + n_{(M-F)}}{n_{(P-OH)} + n_{(M-OH)}} \leq 1.10$$

preferably the molar ratio is ≥ to 0.985, ≥ to 0.990 or ≥ to 0.995, preferably the molar ratio is ≤ to 1.015, ≤ to 1.010 or ≤ to 1.005, Step b) extracting the solvent and the salts, in order to obtain a powder.

Preferably, p=q=r=s=0.

The method described above produces a specific PEKK powder having notably a low volatiles content, which helps obtain a PEKK with the specific properties in particular the specific higher enthalpy of fusion $\Delta H_f$. According to an embodiment, the PEKK polymer has a Td(1%) of at least 500° C., preferably of at least 505° C., more preferably of at least 510° C., as measured by thermal gravimetric analysis according to ASTM D3850, with a heating from 30° C. to 800° C. under nitrogen using a heating rate of 10° C./min. Td(1%) represents the temperature at which a determined amount of volatile materials (=1.0 wt. %) have left the sample.

In an embodiment, $R^3$, $R^4$, $R^5$ and $R^6$ are, at each location in formulas (P-OH), (P-F), (M-OH) and (M-F) above, are independently selected from the group consisting of a C1-C12 moiety optionally comprising one or more than one heteroatoms; sulfonic acid and sulfonate groups; phosphonic acid and phosphonate groups; amine and quaternary ammonium groups.

The T/I ratio is controlled by the amounts of (P-F)+(P-OH) and of (M-F)+(M-OH).

In a preferred embodiment, the polycondensation leading to the PEKK polymer involves only the following monomers: (P-OH), (M-OH) and (P-F).

Step a): the polycondensation of step a) is based on a nucleophilic substitution. The polycondensation takes place in a solvent such as DPS in the presence of a salt at least one base selected in the group of $Na_2CO_3$, $K_2CO_3$ or a combination thereof. The temperature of step a) is usually between 250° C. and 350° C., more particularly between 300° C. and 350° C.

The amount of base(s) should preferably be enough to activate all the OH groups of the monomers. The amount of bases is usually slightly higher than the amount of OH groups. A molar excess between 1.0 and 5.0% may be used.

According to an embodiment, the base(s) is/are added to a mixture comprising the solvent and the monomers, the mixture being preferably at a temperature higher than 250° C., notably between 250° C. and 350° C. The duration of the introduction of the base(s) may be between 10 min and 120 min, preferably between 30 and 90 min.

According to another preferred embodiment, at the end of the polycondensation, monomer (P-F) and/or (M-F), preferably (P-F), is/are added to the mixture. This ensures that the PEKK polymer contains fluorine-end groups.

In step b), the polymer obtained in step a) is treated so as to remove the solvent and the salts. For instance, step b) may be performed by contacting the polymer with a liquid selected in the group of water, alcohols, ethers, ketones and a combination thereof. The liquid may conveniently be a mixture of water and a liquid selected in the group of water, alcohols, ethers, ketones and a combination thereof. The liquid may also comprise an acid or a base.

The synthesis approach may involve an additional step of contacting the PEKK, preferably washing the PEKK, with a solution of at least one of sodium dihydrogen phosphate ($NaH_2PO_4$), disodium hydrogen phosphate ($Na_2HPO_4$), potassium dihydrogen phosphate ($KH_2PO_4$) and dipotassium hydrogen phosphate ($K_2HPO_4$), or mixture thereof. For example, the PEKK may be contacted (e.g. washed) with a solution, e.g. and aqueous solution, including both $NaH_2PO_4$ and $Na_2HPO_4$. The phosphate salts used of the solutions used hereby can for example be anhydrous, monohydrate, dihydrate or heptahydrate.

In addition to the step of contacting the PEKK polymer with a solution of at least one of sodium dihydrogen phosphate ($NaH_2PO_4$), disodium hydrogen phosphate ($Na_2HPO_4$), potassium dihydrogen phosphate ($KH_2PO_4$) and dipotassium hydrogen phosphate ($K_2HPO_4$), or mixture thereof, the synthesis approach may also involve at least one step of contacting the PEKK, preferably washing the PEKK, with a solution including an acid or base in an amount sufficient to neutralize the PEKK polymer.

Suitable acids and bases include any organic or inorganic acid or base that exhibits a solubility of at least 0.1 wt. % in organic solvents such as alcohols, ketones, amides, aromatic hydrocarbons or in water at temperatures below the boiling point of the solvent. Preferably, the solvent has a boiling point of at most 250° C., more preferably at most 150° C. and most preferably at most 100° C. The acids preferably have a $pK_a$ ranging from 3.0 to 7.5, and the bases preferably have a $pK_b$ ranging from −1.0 to 8.0.

In some embodiments, the acid is selected from acetic acid, mono alkali metal citrates and combinations thereof.

In some embodiments, the base is selected from organic amines, tetraalkylammonium hydroxide, tetraalkylammonium acetate, tetraalkylphosphonium hydroxide, tetraalkylphosphonium acetate, alkali or alkaline earth metal hydroxides, alkali or alkaline earth metal monohydrogenphosphates, alkali or alkaline earth metal phosphates, and combinations thereof.

The preferred solvent is water, alcohol, ether, or ketones with boiling point of at most 150° C.; however, any solvent capable of dissolving at least 0.1 wt. % of the acid or base, and which does not adversely react with the PEKK polymer, may be used. Preferably the solvent is water, methanol, ethanol, propanol, or isopropanol. More preferably the solvent is water, methanol, or ethanol. In some embodiments, more than one solvent can be used.

The PEKK polymer may be more particularly prepared according to the recipes disclosed in examples 1-3, notably according to example 3, the T/I ratio being modified by variation of the quantities of monomers (see Tables 1 and 2).

The method of preparation disclosed herein, either generally or according to the specific embodiments disclosed, makes it possible to obtain a specific PEKK polymer having one or more of the following properties:

the PEKK polymer contains fluorine in an amount generally higher than 100 ppm, preferably higher than 200 ppm, even more preferably higher than 300 ppm. Such polymer-bound fluorine is the inevitable fingerprint of the use of fluorine-containing monomers;

the PEKK polymer is substantially free of aluminium. The amount of Al in the PEKK polymer is generally below 50 ppm, preferably below 25 ppm, more preferably below 10 ppm;

the PEKK polymer has a Td(1%) of at least 500° C., preferably of at least 505° C., more preferably of at least 510° C., as measured by thermal gravimetric analysis according to ASTM D3850, with a heating from 30° C. to 800° C. under nitrogen using a heating rate of 10° C./min.

The Al and F contents are conveniently determined by elemental analysis, such as ICP-OES analysis for Al and Combustion-ion chromatography for fluorine.

Nucleating Agent(s)

According to the present invention, the film further comprises at least one nucleating agent. The nucleating agent may be selected from the group consisting of boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), nitrides and so forth. The nucleating agent can also be carbon based. Nucleating agents in this category includes graphite, graphene, graphitic nanoplatelets and graphene oxide. It can also be a carbon black as well as other forms of carbon.

Particularly good results have been obtained when the nucleating agent was boron nitride.

The proportion of nucleating agent is generally lower than 2.0 wt. %, even lower than 1.5 wt. %, this proportion being relative to the weight of the PEKK polymer. This proportion is usually higher than 0.1 wt. %, even higher than 0.5 wt. %. This proportion is usually between 0.5 and 2.0 wt % or between 0.5 and 1.5 wt. %.

Other Additives

In some embodiments, the film comprises at least one additive, as further component other than the PEKK polymer(s) and the nucleating agent(s). Suitable additives include, but are not limited to, (i) colorants such as dyes (ii) pigments such as titanium dioxide, zinc sulfide and zinc oxide (iii) light stabilizers, e.g., UV stabilizers, (iv) heat stabilizers, (v) antioxidants such as organic phosphites and phosphonites, (vi) acid scavengers, (vii) processing aids, (ix) internal lubricants and/or external lubricants, (x) flame retardants, (xi) smoke-suppressing agents, (x) anti-static agents, (xi) anti-blocking agents, (xii) conductivity additives such as carbon black and carbon nanofibrils, (xiii) plasticizers, (xiv) flow modifiers, (xv) extenders, (xvi) metal deactivators and (xvii) flow aids such as silica. The film may comprise at one additive, two, three or several additives of the same category or of different categories as listed above, for example one heat stabilizer and one pigment.

According to these embodiments, the amount of such additive(s) is less than 20 wt. %, preferably less than 10 wt. %, more preferably less than 5 wt. % and even more preferably less than 2 wt. % of additives, most preferably less than 1 wt. %, based on total weight of the film.

In another embodiment, the film is free of any filler, or contains less than 0.5 wt. %, preferably less than 0.1 wt. % of any filler.

In another embodiment, the film is free of any filler, but contains "reinforcing fibrous fibers", as described below, such as scrims, nonwovens or lightweight fabrics. The term "reinforcing fibrous fibers" may include one or more fibrous materials adapted for the reinforcement of composite structures, i.e., a "reinforcing fiber". The term "fiber" is used herein to refer to fibers, organic and/or inorganic, that have a length of at least 0.5 mm.

As described herein, the film comprises a polymeric component, which is at least one PEKK polymer, as well as at least one nucleating agent. As used herein, the term "polymeric component" means a compound having repeat units and a molecular weight of at least 2,000 g/mol.

In some embodiments, the PEKK polymer, as above detailed, is the only polymeric component in the film.

In some other embodiments, the polymeric component of the film comprises a blend of more than one polymer, for example several PEKK polymers or a blend of distinct polymers.

For example, the polymeric component of the film may consist in a blend of PEKK and one additional distinct polymer, wherein at least 60 wt. % of the polymeric component consists in the PEKK as described above, and less than 40 wt. % consists in at least one polymer distinct from the PEKK polymer described above. As another example, the polymeric component of the film consists in at least 70 wt. % of the PEKK described above, and less than 30 wt. % of at least one polymer distinct from the PEKK polymer described above. As another example yet, the polymeric component of the film consists in at least 80 wt. % of the PEKK described above, and less than 20 wt. % of at least one polymer distinct from the PEKK polymer described above. As another example, the polymeric component of the film consists in at least 90 wt. % of the PEKK described above, and less than 10 wt. % of at least one polymer distinct from the PEKK polymer described above.

In some embodiments, the polymeric component of the film comprises less than 3 wt. %, less than 2 wt. %, less than 1 wt. %, or less than 0.5 wt. % of a polymer distinct from the PEKK polymer described above.

Such distinct polymer may be selected from the group consisting of poly(aryl ether sulfone) (PAES) polymers and poly(aryl ether ketone) (PAEK) polymers. When the additional polymer component is a PAES polymer, it may be selected from the group consisting of a polysulfone (PSU), a polyphenylsulfone (PPSU), and a poly(ether sulfone) (PES). When the additional polymer component is a PAEK polymer, it may be advantageously selected from the group consisting of a poly(ether ether ketone) (PEEK) polymer, a poly(ether ketone ketone) (PEKK) polymer, a poly(etherketone) (PEK), a poly(ether ketone ether ketone ketone) (PEKEKK) and a PEEK-PEDEK copolymer. The additional polymer component may also be a polyimide, such as polyetherimide (PEI) or poly(amideimide) (PAI).

In certain embodiments, the film comprises at least 90 wt. % of the PEKK polymer and at least one additive. Most preferably, the film comprises at least 95 wt. %, preferably at least 98 wt. % of the PEKK polymer and at least one additive, based on the total weight of the film.

Scrim, Nonwoven and Lightweight Reinforcement

The film of the assembly may additionally comprise scrim(s) and/or nonwoven reinforcement(s) and/or lightweight fabric(s), which help to regulate the melt flow and/or provide a uniform surface to bond to, as well potentially influencing the local morphology in the bond line.

The film described herein may advantageously include a scrim, or a scrim layer.

The scrim may be made of natural wovens, synthetic wovens, nonwovens, knits (including without limitation weft insertion knits) or plastics.

The film described herein may also advantageously include a nonwoven, also called a nonwoven fabric or fiber web.

Such scrims, nonwovens or lightweight fabrics are advantageous as they help maintaining an uniform bondline thickness.

Process to Prepare the Film

The film described herein may have a thickness ranging from 15 to 800 μm, from 25 to 600 μm, preferably from 30 to 500 μm, more preferably from 40 to 300 μm, most preferably from 50 to 250 μm.

The film described may be prepared by any conventional method known in the art of polymer processing. For example, the components of the film can be processed in the form of a film by cast extrusion, optionally with mono- or bi-axial orientation.

In some embodiments, the method of making the film includes melt compounding a physical mixture of the components of the film. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

According to an embodiment, the ingredients of the film are put into contact in a solvent of PEKK such as DPS and the mixture is stirred at a temperature at which the polymer dissolves totally or partly in the solvent. The solvent is then extracted for instance with the method already disclosed above. Example 4 illustrates this embodiment.

According to an embodiment, a physical mixture containing the ingredients of the film is compounded in an extruder and then chopped into pellets or granules. The granules or pellets can then be further processed to manufacture the film.

Alternatively, the physical mixture is compounded in an extruder and then directly formed into a film.

A technique particularly adapted to the manufacture of the films involves extruding the molten composition through a die having elongated shape so as to obtain an extruded tape and casting/calendering said extruded tape so as to obtain a film. The tape can be calendered into a film by passing through appropriate rolls, which can be maintained at appropriate temperatures, and whose speed can be adjusted so as to achieve the required thickness. The thickness of the film is adjusted at the die. The film can be either amorphous or semicrystalline in its finished (extruded) form, depending on the cooling temperatures utilized to solidify the film.

In an advantageous embodiment, the film is a monolayer film, i.e. it consists of only one layer comprising a PEKK copolymer.

When the film comprises a scrim, a nonwoven or a lightweight fabric, these reinforcing layers or fabric reinforcements may be impregnated with the PEKK polymer by a variety of methods, such as APC process, slurry impregnation process or film lamination. For example, the process may comprise:

- impregnating the fabric in a liquid medium, comprising the PEKK component in the shape of polymer powder particles, at least an aqueous solvent and at least one surfactant,
- heating the impregnated fabric above the melting temperature of the PEKK, and
- shaping the fabric, for example using at least one die of specific geometry.

Polymers (P1) and (P2)

The expression "first component comprising a polymer (P1)" is used herein to refer to a component having at least one surface, notably the surface in contact with the bonding film, comprising a polymer (P1). First component may consist of said polymer (P1). Alternatively, first component comprises one surface comprising polymer (P1). The surface comprising polymer (P1) typically has a thickness suitable to form a bond with the bonding film. Said thickness may conveniently be equal to or greater than 5 μm.

The expression "second component comprising a polymer (P2)" is used herein to refer to a component having at least one surface, notably the surface in contact with the bonding film, comprising a polymer (P2). Second component may consist of said polymer (P2). Alternatively, second component comprises one surface comprising polymer (P2). The surface comprising polymer (P2) typically has a thickness suitable to form a bond with the bonding film. Said thickness may conveniently be equal to or greater than 5 μm.

Polymer (P1) and polymer (P2) may be the same or distinct.

Polymer (P1) and polymer (P2) may independently be selected from the group consisting of crystalline and/or high temperature thermoplastic polymers. Non-limiting examples include, but are not limited to, poly(aryl ether ketones) (PAEK), poly(etherimides) (PEI), poly(amide imides) (PAI), poly(aryl ether sulfones) (PAES), poly(arylene sulphides) (PAS), poly(phthalamides) (PPA), polyamides (PA), polycarbonates (PC), liquid crystal polymers (LCP), poly(aromatic esters) (PAE) and blends thereof.

In a preferred embodiment, polymer (P1) and polymer (P2) are independently selected from the group consisting of PAEK and blends of PAEK. The PAEK can for example be selected from the group consisting of a poly(ether ether ketone) (PEEK) polymer, a PEEK copolymer, a poly(ether ketone ketone) (PEKK) polymer, a poly(etherketone) (PEK) and a poly(ether ketone ether ketone ketone) (PEKEKK). The PEEK copolymer can for example be a PEEK-PEDEK copolymer.

Poly(Aryl Ether Ketone) (PAEK)

As used herein, a poly(aryl ether ketone) (PAEK) denotes any polymer comprising recurring units ($R_{PAEK}$) comprising a Ar'-C(=O-Ar* group, where Ar' and Ar*, equal to or different from each other, are aromatic groups, the mol. % being based on the total number of moles of recurring units in the polymer. The recurring units ($R_{PAEK}$) are selected from the group consisting of units of formulas (J-A) to (J-D) below:

(J-A)

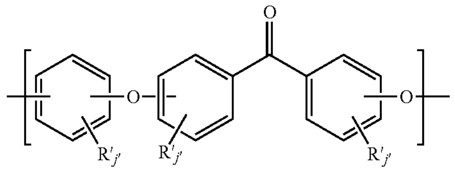

(J-B)

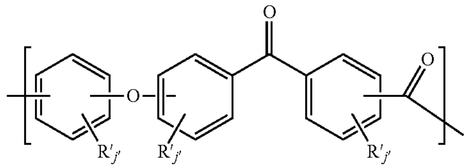

(J-C)

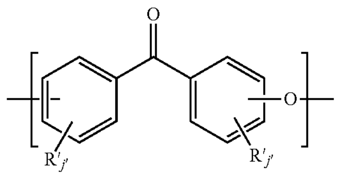

(J-D)

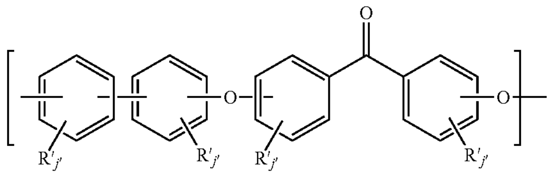

where

- R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
- j' is independently zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, the phenylene moieties have 1,3- or 1,4-linkages, more preferably they have a 1,4-linkage.

In recurring units ($R_{PAEK}$), j' is preferably at each location zero so that the phenylene moieties have no other substituents than those linking the main chain of the polymer.

According to an embodiment, the PAEK is a poly(ether ether ketone) (PEEK).

As used herein, a poly(ether ether ketone) (PEEK) denotes any polymer comprising recurring units ($R_{PEEK}$) of formula (J-A), based on the total number of moles of recurring units in the polymer:

(J-A)

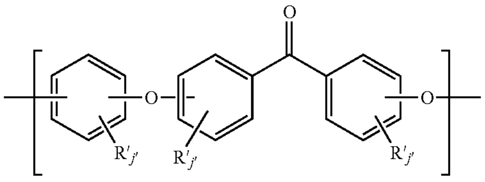

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4 (for example 1, 2, 3 or 4).

According to formula (J-A), each aromatic cycle of the recurring unit ($R_{PEEK}$) may contain from 1 to 4 radical groups R'. When j' is 0, the corresponding aromatic cycle does not contain any radical group R'.

Each phenylene moiety of the recurring unit ($R_{PEEK}$) may, independently from one another, have a 1,2-, a 1,3- or a 1,4-linkage to the other phenylene moieties. According to an embodiment, each phenylene moiety of the recurring unit ($R_{PEEK}$), independently from one another, has a 1,3- or a 1,4-linkage to the other phenylene moieties. According to another embodiment yet, each phenylene moiety of the recurring unit ($R_{PEEK}$) has a 1,4-linkage to the other phenylene moieties.

According to an embodiment, R' is, at each location in formula (J-A) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units ($R_{PEEK}$) are according to formula (J'-A):

(J'-A)

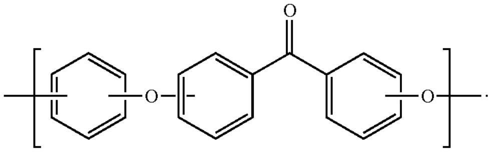

According to another embodiment of the present disclosure, a poly(ether ether ketone) (PEEK) denotes any polymer comprising at least 10 mol. % of the recurring units are recurring units ($R_{PEE}$K) of formula (J-A')

(J"-A)

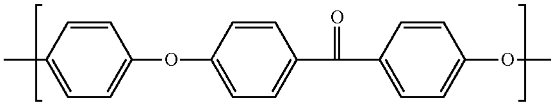

the mol. % being based on the total number of moles of recurring units in the polymer.

According to an embodiment of the present disclosure, at least 10 mol. % (based on the total number of moles of recurring units in the polymer), at least 20 mol. %, at least 30 mol. %, at least 40 mol. %, at least 50 mol. %, at least 60 mol. %, at least 70 mol. %, at least 80 mol. %, at least 90 mol. %, at least 95 mol. %, at least 99 mol. % or all of the recurring units in the PEEK are recurring units ($R_{PEEK}$) of formulas (J-A), (J'-A) and/or (J"-A).

The PEEK polymer can therefore be a homopolymer or a copolymer. If the PEEK polymer is a copolymer, it can be a random, alternate or block copolymer.

When the PEEK is a copolymer, it can be made of recurring units ($R^*_{PEEK}$), different from and in addition to recurring units ($R_{PEEK}$), such as recurring units of formula (J-D):

(J-D)

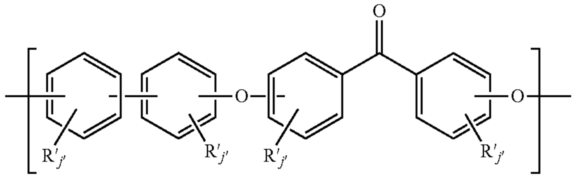

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4.

According to formula (J-D), each aromatic cycle of the recurring unit ($R^*_{PEEK}$) may contain from 1 to 4 radical groups R'. When j' is 0, the corresponding aromatic cycle does not contain any radical group R'.

According to an embodiment, R' is, at each location in formula (J-D) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units ($R^*_{PEEK}$) are according to formula (J'-D):

(J'-D)

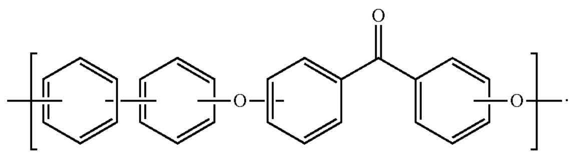

According to another embodiment of the present disclosure, the recurring units ($R^*_{PEEK}$) are according to formula (J"-D):

(J"-D)

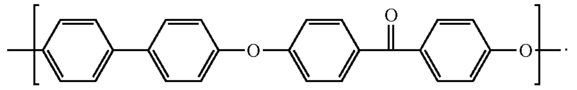

According to an embodiment of the present disclosure, less than 90 mol. % (based on the total number of moles of recurring units in the polymer), less than 80 mol. %, less than 70 mol. %, less than 60 mol. %, less than 50 mol. %, less than 40 mol. %, less than 30 mol. %, less than 20 mol. %, less than 10 mol. %, less than 5 mol. %, less than 1 mol. % or all of the recurring units in the PEEK are recurring units ($R^*_{PEEK}$) of formulas (J-D), (J'-D), and/or (J"-D).

According to an embodiment, the PEEK polymer is a PEEK-PEDEK copolymer.

As used herein, a PEEK-PEDEK copolymer denotes a polymer comprising recurring units ($R_{PEEK}$) of formula (J-A), (J'-A) and/or (J"-A) and recurring units ($R^*_{PEEK}$) of formulas (J-D), (J'-D) or (J"-D) (also called hereby recurring units ($R_{PEDEK}$)). The PEEK-PEDEK copolymer may include relative molar proportions of recurring units ($R_{PEEK}$/$R_{PEDEK}$) ranging from 95/5 to 5/95, from 90/10 to 10/90, or from 85/15 to 15/85. The sum of recurring units ($R_{PEEK}$) and ($R_{PEDEK}$) can for example represent at least 60 mol. %, 70 mol. %, 80 mol. %, 90 mol. %, 95 mol. %, 99 mol. %, of recurring units in the PEEK copolymer. The sum of recurring units ($R_{PEEK}$) and ($R_{PEDEK}$) can also represent 100 mol. %, of recurring units in the PEEK copolymer.

PEEK is commercially available as KetaSpire© PEEK from Solvay Specialty Polymers USA, LLC.

According to one embodiment of the present disclosure, the PEEK polymer has a weight average molecular weight (Mw) ranging from 55,000 to 105,000 g/mol, for example from 65,000 to 85,000 g/mol, (as determined by gel permeation chromatography (GPC) using phenol and trichlorobenzene (1:1) at 160° C., with polystyrene standards).

In another embodiment, the PAEK is a poly(ether ketone ketone) (PEKK). The PEKK described in connection with polymers (P1) and (P2) may be distinct from the one used to prepare the film bonding the two components of the assembly. Notably, this PEKK polymer may have a different T/I ratio. Polymers (P1) and (P2) may be the same or distinct PEKK themselves, for example PEKK having different T/I ratio.

More precisely, the poly(ether ketone ketone) (PEKK) which may be used as polymer(s) of the first and second components of the assembly actually denotes a polymer comprising more than 50 mol. % of the recurring units of formulas ($J-B_1$) and ($J-B_2$), the mol. % being based on the total number of moles of recurring units in the polymer:

($J-B_1$)

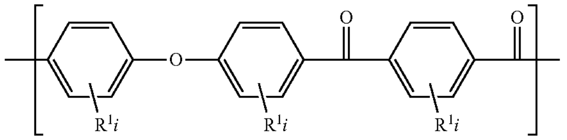

($J-B_2$)

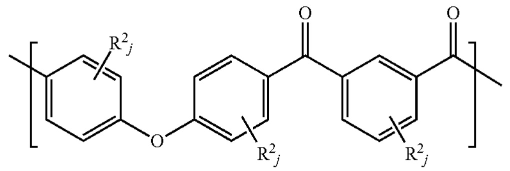

wherein $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4.

According to an embodiment, $R^1$ and $R^2$ are, at each location in formula ($J-B_2$) and ($J-B_1$) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to another embodiment, i and j are zero for each $R^1$ and $R^2$ group. According to this embodiment, the PEKK polymer comprises at least 50 mol. % of recurring units of formulas ($J'-B_1$) and ($J'-B_2$), the mol. % being based on the total number of moles of recurring units in the polymer:

($J'-B_1$)

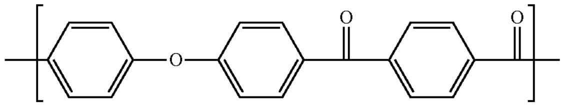

($J'-B_2$)

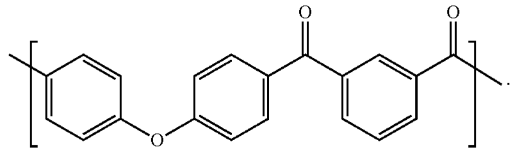

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units of formulas ($J-B_1$) and ($J-B_2$).

In certain embodiments, polymer (P1) and polymer (P2) are independently selected from PEKK polymer as defined above with a molar ratio of recurring units ($J-B_1$)/($J'-B_1$) to recurring units ($J-B_2$)/($J'-B_2$), also called T/I ratio, in the range from 55/45 to 85/15, preferably from 57/43 to 80/20, more preferably from 58/42 to 75/25.

A PEKK polymer is known to be characterized by a T/I ratio which is the molar ratio of the terephthaloyl (T) to isophthaloyl (I) moieties that are present in the polymer.

In other embodiments, polymer (P1) and polymer (P2) may be independently selected from compositions comprising a first and a second PEKK polymer, each PEKK polymer being characterised by a T/I ratio, wherein the T/I ratio of the first PEKK polymer is different from T/I ratio of the second PEKK polymer, in particular those compositions having a melting temperature of less than or equal to 330° C. In an aspect of this embodiment, the first PEKK polymer preferably has a T/I ratio of a) at least 50/50, preferably of at least 54/46, more preferably of at least 56/44, most preferably of at least 57/43 and/or b) a T/I ratio of at most 64/36, preferably of at most 63/37, more preferably of at most 62/38. The second PEKK polymer preferably has a T/I ratio of a) at least 65/35, preferably of at least 66/34, more preferably of at least 67/33, and/or b) a T/I of at most 85/15, preferably of at most 83/17, more preferably of at most 82/18.

PEKK is notably commercially available as NovaSpire® PEKK from Solvay Specialty Polymers USA, LLC, or as Cypek® FC and Cypek® DS.

In one embodiment, the polymer(s) (P1) and/or (P2) is a nucleophilic PEKK, that-is-to-say a PEKK produced by polycondensation of monomers in the absence of a Lewis acid, wherein the monomers are di-hydroxy and di-fluoro benzoyl-containing aromatic compounds and/or of hydroxyl-fluoro benzoyl-containing aromatic compounds.

In an alternative embodiment, polymer PEKK is an electrophilic PEKK.

In another embodiment, the PAEK is a poly(ether ketone) (PEK). As used herein, the expression "poly(ether ketone)" and "polymer (PEK)" denotes any polymer of which more than 50 mol. % of the recurring units ($R_{PEK}$) are recurring units of formula (K'-C):

(K'-C)

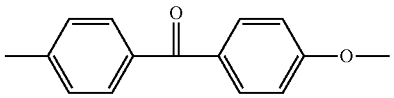

the mol. % being based on the total number of moles of recurring units in the PEK.

According to this embodiment, the PEK polymer may be such that at least 60 mol. %, at least 70 mol. %, at least 80 mol. %, at least mol. %, at least 95 mol. %, at least 99 mol. %, or even substantially all of the recurring units ($R_{PEK}$) are recurring units (K'-C). Preferred PEK polymers are those wherein substantially all recurring units are units of formula (K'-C), being understood that end-groups, defects and minor amounts of impurities may be present.

In some embodiments, the polymer (PAEK) is a poly (ether diphenyl ether ketone) (PEDEK). As used herein, the expression "poly(ether diphenyl ether ketone)" or "polymer (PEDEK)" denotes any polymer of which more than 50 mol. % of the recurring units ($R_K$) are recurring units of formula (K'-D):

(K'-D)

(K'-D)

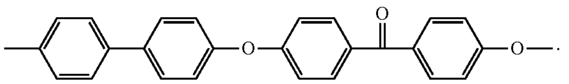

the mol. % being based on the total number of moles of recurring units in the PEDEK.

According to these embodiments, at least 60 mol. %, at least 70 mol. %, at least 80 mol. %, at least mol. %, at least 95 mol. %, at least 99 mol. %, or even substantially all recurring units ($R_K$) are recurring units (K'-D), as above detailed. Preferred PEDEK polymers are those wherein substantially all recurring units are units of formula (K'-D), being understood that end-groups, defects and minor amounts of impurities may be present.

In some embodiments, the first component of the assembly may comprise polymer (P1), as well as a filler. Said filler may include a fibrous filler or a non-fibrous filler. Said filler may include both a fibrous filler and a non-fibrous filler.

Additionally, or alternatively, the second component of the assembly may comprise polymer (P2), as well as a filler. Said filler may include a fibrous filler, or a non-fibrous filler. Said filler may include both a fibrous filler, and a non-fibrous filler.

According to a preferred embodiment, both the first and second components of the assembly comprise at least one filler, which may be the same or different. According to this embodiment, the film which is positioned between the first and second component may comprise itself a filler, which may be the same of different from the filler used in the first or second components of the assembly.

Alternatively, the film which is positioned between the first and second component preferably does not comprise a filler (or comprise a filler in an amount of less than 1 wt. %, less than 0.5 wt. % or even less than 0.1 wt. % based on the total weight of the film).

Suitable fibrous fillers include, for example, carbon fibers, graphite fibers, glass fibers, such as E glass fibers, ceramic fibers such as silicon carbide fibers, synthetic polymer fibers such as aromatic polyamide fibers, polyimide fibers, high-modulus polyethylene (PE) fibers, polyester fibers and poly-benzoxazole fibers such as poly-p-phenylene-benzobisoxazole (PBO) fibers, aramid fibers, boron fibers, basalt fibers, quartz fibers, alumina fibers, zirconia fibers and mixtures thereof. Fibers may be continuous or discontinuous and may be aligned or randomly oriented.

In some embodiments, the fibers include at least one carbon fiber. As used herein, the term "carbon fiber" is intended to include graphitized, partially graphitized, and ungraphitized carbon reinforcing fibers, as well as mixtures thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

In some embodiments, the fibers include at least one glass fiber. Glass fibers may have a circular cross-section or a non-circular cross-section (such as an oval or rectangular cross-section). When the glass fibers used have a circular cross-section, they preferably have an average glass fiber diameter of 3 to 30 μm, with a particularly preferred average glass fiber diameter of 5 to 12 μm. Different types of glass fibers with a circular cross-section are available on the market depending on the type of the glass they are made of. One may notably cite glass fibers made from E- or S-glass. In some embodiments, the glass fiber is standard E-glass material with a non-circular cross section. In some embodiments, the first and second components of the assembly includes S glass fibers with a circular cross-section.

In an embodiment, the first and second components of the assembly of the present invention comprises continuous fibers. As referred to herein, "continuous fibers" refer to fibers having a length of greater than or equal to 3 mm, more typically greater than or equal to 10 mm and an aspect ratio of greater than or equal to 500, more typically greater than or equal to 5000.

In an embodiment of the invention, the first component is a composite material, also called laminate, comprising one or more layers, these layers for example comprising polymer (P1) and fibers. Polymer (P1) may for example be either impregnated, coated or laminated onto the fibers.

In further embodiment of the invention, the second component is a composite material, also called laminate, comprising one or more layers, these layers for example comprising fibers and polymer (P2). Polymer (P2) may for example be either impregnated, coated or laminated onto the fibers.

A second object of the invention is a method of making an assembly using the film as described above. The method comprises the steps of:

a) arranging the film between a first component comprising a polymer (P1) and a second component comprising a polymer (P2); and
b) subjecting the film to a temperature ($T_m^x$), wherein:

$$T_m^x \geq T_m \quad (1), \text{ or}$$

$$T_m^x > T_m \quad (2), \text{ or}$$

$$T_m^x > T_m + 5 \quad (3), \text{ or}$$

$$T_m^x > T_m + 10 \quad (4),$$

wherein $T_m$ is the melting temperature (° C.) of the film.

In other words, temperature ($T_m^x$) is a processing temperature which is suitable to melt the film. Temperature ($T_m^x$) is equal to and preferably higher than the melting temperature ($T_m$) of the film.

Temperature ($T_m^x$) may be lower than 330° C., preferably less than 320° C., more preferably less than 310° C. Temperature ($T_m^x$) may be higher than 270° C., for example higher than 275° C. Temperature ($T_m^x$) may be in the range 274° C. to 328° C., for example in the range 278° C. to 315° C.

According to some embodiments, the temperature ($T_m^x$) is lower than the melting temperature of polymer (P1) ($T_{m1}$) and/or lower than the melting temperature of polymer (P2) ($T_{m2}$):

$$T_m^x < T_{m1} \quad (5), \text{ and/or}$$

$$T_m^x < T_{m2} \quad (6).$$

wherein $T_{m1}$ and $T_{m2}$ are respectively the melting temperatures of the polymer (P1) and polymer (P2).

Advantageously, the temperature ($T_m^x$) is lower than both the melting temperatures of polymer (P1) ($T_{m1}$) and polymer (P2) ($T_{m2}$).

According to some embodiments:

$$T_m^x < T_{m1} - 5 \quad (7),$$

$$T_m^x < T_{m2} - 5 \quad (8),$$

$$T_m^x < T_{m1} - 10 \quad (9), \text{ and/or}$$

$$T_m^x < T_{m2} - 10 \quad (10).$$

In some preferred embodiments, whilst the film and the first and second components of the assembly are subjected to temperature ($T_m^x$), the method further comprises applying pressure, on the assembly in order to consolidate the assembly. In other words, the method preferably further comprises applying pressure to the first and second components, concomitantly to step b), subjecting the film to a temperature ($T_m^x$).

The method of the invention preferably further comprises a step c) consisting in a controlled cooling of the assembly. This additional step is advantageous in order to build the crystallinity in the film. The film in the assembly preferably presents a crystallinity of at least 3%, preferably at least 5%, more preferably at least 15%, especially at least 20%, after cooling, crystallinity being measured as described in the examples below.

A third aspect of the invention relates to the use of the assembly described herein to prepare parts or articles to be used for various end-uses applications. Mention may be made of applications in the aerospace and automotive industries. For example, parts and articles comprising or consisting of the assembly of the present invention can include, but are not limited to, brackets, clips, stiffeners and other similar type parts.

The invention will be herein after illustrated in greater details in the following section by means of non-limiting examples.

Should the disclosure of any patents, patent applications, and publications which are incorporated herein by reference conflict with the description of the present application to the extent that it may render a term unclear, the present description shall take precedence.

EXAMPLES

Raw Materials Used 1,2-dichlorobenzene, terephthaloyl chloride, isophthaloyl chloride, 3,5-dichlorobenzoylchloride, aluminum chloride ($AlCl_3$), methanol were purchased from Sigma Aldrich.

1,4-Bis(4-phenoxybenzoyl)benzene was prepared according to IN patent 193687 (filed on Jun. 21, 1999 and incorporated herein by reference).

Diphenyl sulfone (polymer grade) was procured from Proviron (99.8% pure).

Sodium carbonate, light soda ash, was procured from Solvay S.A., France and dried before use. Its particle size was such that its $d_{90}$ was 130 μm.

Potassium carbonate with a $d_{90}$<45 μm was procured from Armand products and dried before use.

Lithium chloride (anhydrous powder) was procured from Acros.

$NaH_2PO_4 \cdot 2H_2O$ and $Na_2HPO_4$ were purchased from Sigma-Aldrich.

1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-BHBB and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol. Boron nitride: Boronid® S1-SF, a hexagonal boron nitride grade available commercially from 3M Corporation Determination of the Glass Transition Temperature (Tg). Melting Temperature ($T_m$), Crystallization Temperature (Tc) and Heat of Fusion ($\Delta H_f$)

The glass transition temperature (Tg), melting temperature ($T_m$), crystallization temperature (Tc) and heat of fusion ($\Delta H_f$) is determined by differential scanning calorimeter (DSC) according to ASTM D3418, using a heating and cooling rate of 10° C./min.

$T_g$ (mid-point, using the half-height method), heat of fusion $\Delta H_f$ and $T_m$ (peak temperature of the melting endotherm) were determined on the $2^{nd}$ heat scan. $T_c$ was determined as the peak temperature of the crystallization exotherm on the $1^{st}$ cool scan.

The melting of the composition was taken as the area over a linear baseline drawn from 220° C. to a temperature above the last endotherm. When assessing the crystallinity of the film in the bonded structure (part), the heat of fusion was determined on the $1^{st}$ heat scan.

Details of the procedure are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

$1^{st}$ heat cycle: 30.00° C. to 400.00° C. at 10.00° C./min, isothermal at 400.00° C. for 1 min;

$1^{st}$ cool cycle: 400.00° C. to 30.00° C. at 10.00° C./min, isothermal for 1 min;

$2^{nd}$ heat cycle: 30.00° C. to 400.00° C. at 10.00° C./min, isothermal at 400.00° C. for 1 min.

Determination of the Melt Flow Index

The melt flow index was determined according to ASTM D1238 at the indicated temperature (340 to 380° C. depending on the melting point of the material) with a 3.8 kg weight. The final MFI for a 8.4 kg weight was obtained by multiplying the value obtained by 2.35.

Synthesis Examples

PEKK #1 with T/I=71/29

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone (DPS), 23.054 g of 1,3-BHBB, 16.695 g of 1,4-BHBB and 41.292 g of 1,4-DFDK. The flask content was evacuated under vacuum and then filled with high purity nitrogen (containing less than 10 ppm $O_2$). The reaction mixture was then placed under a constant nitrogen purge (60 mL/min). The reaction mixture was heated slowly to 270° C. At 270° C., 13.725 g of $Na_2CO_3$ and 0.078 g of $K_2CO_3$ was added via a powder dispenser to the reaction mixture over 60 minutes. At the end of the addition, the reaction mixture was heated to 310° C. at 1° C./minute. After 2 minutes at 310° C., 1.107 g of 1,4-DFDK were added to the reaction mixture while keeping a nitrogen purge on the reactor. After 5 minutes, 0.741 g of lithium chloride were added to the reaction mixture. 10 minutes later, another 0.402 g of 1,4-DFDK were added to the reactor and the reaction mixture was kept at temperature for 15 minutes. Another charge of 15 g of diphenyl sulfone was added to the reaction mixture, which was kept under agitation for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4$-$2H_2O$ and 0.62 g of $Na_2HPO_4$ were dissolved in 1200 mL DI water for the last wash. The powder was then removed from the reactor and dried at 120° C. under vacuum for 12 hours yielding 72 g of a yellow powder.

PEKK #2 and PEKK #3: PEKK Polymers with Variable T/I and Different Melt Viscosity (MV)

The same procedure as example 1 was followed with the amounts of reagents indicated in table 1 below.

TABLE 1

| Example | Quantities | #1 | #2 | #3 |
|---|---|---|---|---|
| T/I | | 71/29 | 58/42 | 54/46 |
| DPS | g | 112.50 | 112.50 | 119.82 |
| 1,3-BHBB | g | 23.054 | 33.389 | 38.950 |
| 1,4-BHBB | g | 16.695 | 6.360 | 3.387 |
| 1,4-DFDK | g | 41.292 | 41.292 | 43.723 |
| $Na_2CO_3$ | g | 13.725 | 13.725 | 14.618 |
| $K_2CO_3$ | g | 0.078 | 0.078 | 0.092 |
| 1,4-DFDK | g | 1.107 | 0.906 | 1.072 |
| LiCl | g | 0.741 | 0.953 | 0.564 |
| 1,4-DFDK | g | 0.402 | 0.402 | 0.214 |
| DPS | g | 15 | 40 | 30 |
| MFI | g/10 min | 100 | 33 | 30 |
| MFI Temp | ° C. | 360 | 340 | 340 |

TABLE 2

| Example | Quantities | #1 | #2 | #3 |
|---|---|---|---|---|
| (M—OH) | mol | 0.072 | 0.105 | 0.122 |
| (P—OH) | mol | 0.052 | 0.020 | 0.011 |
| (M—OH) + (P—OH) | mol | 0.125 | 0.125 | 0.133 |
| (P—F) | mol | 0.125 | 0.125 | 0.133 |
| $Na_2CO_3$ + $K_2CO_3$ | mol | 0.130 | 0.130 | 0.139 |
| Molar ratio (P—F)/ (M—OH) + (P—OH) | | 1 | 1 | 1 |
| Molar ratio (P—F) + (P—OH)/(M—OH) | | 2.45 | 1.38 | 1.17 |

General Procedure for Solution Blending of PEKK Composition of Example 4

In a 500 mL 4-neck reaction flask fitted with a stirrer, a $N_2$ inlet tube, a Claisen adapter with a thermocouple plunging in the reaction medium, and a condenser were introduced 235.00 g of diphenyl sulfone (DPS), as well as boron nitride as a nucleating agent (table 3). The flask content was heated slowly to 330° C. At 330° C., 100 g of the PEKK polymer powder #3 was slowly added via a flex tube into the molten DPS. At the end of the addition, the agitation speed was increased to provide good mixing and the mixture was held at 330° C. for another hour.

The reactor content was then poured from the reactor into a stainless steel pan and cooled. The solid was broken up and ground in an attrition mill through a 2 mm screen. Diphenyl sulfone was extracted from the mixture with acetone and water. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 90-95 g of a yellow powder.

TABLE 3

| Example | | 1c | 2c | 3c | 4 |
|---|---|---|---|---|---|
| Boron nitride | pph | 0 | 0 | 0 | 1.2 |
| PEKK #1 | wt. % | 100 | | | |
| PEKK #2 | wt. % | | 100 | | |
| PEKK #3 | wt. % | | | 100 | 100 |

Thermal Properties

| | $T_g$ (° C.) | $T_m$ (° C.) | $T_c$ (° C.) | Measured ΔHf (J/g) | Minimal ΔHf (J/g) (eq 1) | Meets eq 1? |
|---|---|---|---|---|---|---|
| 1c | 160 | 346 | 304 | 49 | 105 | no |
| 2c | 159 | 297 | 217 | 22 | 22 | no |
| 3c | 159 | nd | nd | nd | 0 | no |
| 4 | 160 | 284 | nd | 7 | 0 | yes |

As shown by data collected above, the PEKK composition of example 4 (according to the invention) exhibits an improved crystallization and crystallinity as compared to the PEKK compositions of examples 1-3 (no nucleating agent).

The measured enthalpy of fusion ΔHf of the PEKK composition of example 4 is higher than the minimal ΔHf, as calculated per equation 1 below, which means that the PEKK composition of example 4 meets the following equation:

$$\Delta H_f > 1.69 \times T_m - 480 \quad \text{(eq 1)}$$

wherein:

$T_m$ is the melting point in ° C. and $\Delta H_f$ is in J/g

The PEKK composition of example 4, according to the invention, therefore presents a set of properties:

a melting point $T_m \leq 310$° C.;

a heat of fusion $\Delta H_f > 5$ J/g; and a $\Delta H_f$ meeting equation 1, which makes it well-suited to be processed into a film to be used in a laminate structure.

As far as the comparative examples are concerned:

PEEK#1 with a T/I ratio equals to 71/29 presents too high a $T_m$, which is higher than 310° C., and does not meet equation 1;

PEKK#2 with a T/I ratio equals to 58/42 does not meet equation 1 as its measured heat of fusion $\Delta H_f$ equals the minimal heat of fusion $\Delta H_f$ as calculated in equation 1; and PEKK#3 with a T/I ratio within the inventive range (50:50 to 56:44) is amorphous (no $T_m$), therefore not suitable for use in structural applications as being prone to attack by fluids and thereby leading to premature failure of the structure.

The invention claimed is:

1. An assembly comprising:

a first component comprising a polymer (P1), a second component comprising a polymer (P2) and a film positioned between and bonded to the first component and the second component, wherein the film comprises or is made of:

a) at least one poly(ether ketone ketone) (PEKK) polymer, wherein the PEKK polymer comprises at least 50 mol. % of recurring units of formulas (M) and (P), the mol. % being based on the total number of moles in the polymer:

(P)

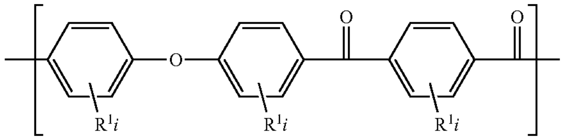

(M)

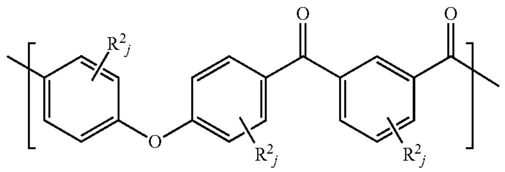

wherein $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4;

wherein the molar ratio of recurring units (P) to recurring units (M) is from 50:50 to 56:44, and b) at least one nucleating agent.

2. The assembly according to claim 1 wherein i and j are 0 for each $R^1$ and $R^2$ group.

3. The assembly according to claim 1 wherein the PEKK polymer comprises at least 95 mol. % of the recurring units of formulae (M) and (P).

4. The assembly according to claim 1 wherein the molar ratio of recurring units (P) to recurring units (M) is from 51:49 to 55:45.

5. The assembly of claim 1 wherein the PEKK polymer exhibits a melting temperature Tm ranging from 270 to 310° C., as measured by DSC according to ASTM D3418.

6. The assembly of claim 1 wherein the PEKK polymer is such that the heat of fusion $\Delta H_f$ meets the following equation:

$$\Delta H_f > 1.69 \times T_m - 480 \quad \text{(eq 1)}$$

wherein:

Tm is the PEKK melting temperature in ° C. and $\Delta H_f$ is in J/g.

7. The assembly of claim 1 wherein the PEKK polymer complies with the set of the following properties:

a melting point $T_m \leq 310$° C.; and a heat of fusion $\Delta H_f > 5$ J/g; and $$\Delta H_f > 1.69 \times T_m - 480 \quad \text{(eq 1)}$$

wherein:

Tm is the PEKK melting temperature in ° C. and $\Delta H_f$ is in J/g.

8. The assembly of claim 1 wherein the heat of fusion $\Delta H_f$ of the PEKK polymer is at least 5.0 J/g.

9. The assembly of claim 1, wherein the film comprises at least one nucleating agent selected from the group consisting of boron-containing compounds, alkaline earth metal carbonates, oxides, silicates, salts of alkaline earth metals, nitrides and carbon-based compounds.

10. The assembly of claim 1, wherein the PEKK polymer is such that it has been manufactured in a solvent in the absence of a Lewis acid or in the presence of an amount of Lewis acid of less than 2 wt. %, based on the total weight of the monomers.

11. The assembly of claim 1, wherein the PEKK polymer contains polymer-bound fluorine in an amount higher than 100 ppm.

12. The assembly of claim 1, wherein the amount of Al in the PEKK polymer is below 50 ppm.

13. The assembly of claim 5, wherein the PEKK polymer exhibits a Td(1%) of at least 500° C., as measured by thermal gravimetric analysis according to ASTM D3850, with a heating from 30° C. to 800° C. under nitrogen using a heating rate of 10° C./min.

14. The assembly of claim 1, wherein the film has a thickness ranging from 15 to 800 μm.

15. The assembly of claim 1, wherein polymer (P1) and polymer (P2) are independently selected from the group consisting of poly(aryl ether ketones) (PAEK), poly(etherimides) (PEI), poly(amide imides) (PAI), poly(aryl ether sulfones) (PAES), poly(arylene sulphides) (PAS), poly(phthalamides) (PPA), polyamides (PA), polycarbonates (PC), liquid crystal polymers (LCP), poly(aromatic esters) (PAE) and blends thereof.

16. The assembly of claim 1, wherein polymer (P1) and/or polymer (P2) are independently selected from the group consisting of PEEK and PEKK, wherein:

PEEK denotes any polymer comprising at least 10 mol. % of the recurring units are recurring units ($R_{PEEK}$) of formula (J"-A):

(J"-A)

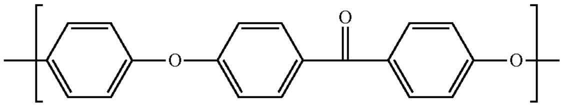

the mol. % being based on the total number of moles of recurring units in the polymer and PEKK denotes any polymer comprises at least 50 mol. % of recurring units of formulas (J'-$B_1$) and (J'-$B_2$), the mol. % being based on the total number of moles of recurring units in the polymer:

(J'-$B_1$)

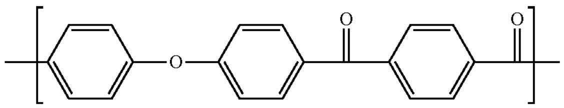

(J'-$B_2$)

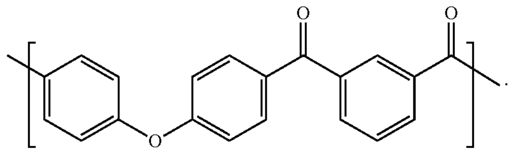

17. The assembly of claim 1, wherein polymer (P1) and polymer (P2) are independently selected from PEKK polymers with a T/I ratio in the range from 55/45 to 85/15 and mixtures thereof.

18. The assembly of claim 1, wherein:

the first component is a composite material comprising one or more layers comprising fibers and polymer (P1), the second component is a composite material comprising one or more layers comprising fibers and polymer (P2), and/or the film comprises at least one scrim, nonwoven or lightweight fabric.

19. The assembly of claim 1 wherein the proportion of nucleating agent(s) is lower than 2.0 wt. %, this proportion being relative to the weight of the PEKK polymer.

20. A method of making the assembly of claim 1, which comprises the steps of:

arranging the film between a first component comprising a polymer (P1) and a second component comprising a polymer (P2); and subjecting the film to a temperature ($T_m^x$), suitable to melt the film but not to melt polymer (P1) and polymer (P2).

* * * * *